(12) United States Patent
Matsuura et al.

(10) Patent No.: US 10,253,671 B2
(45) Date of Patent: Apr. 9, 2019

(54) HEAT EXCHANGER, AND EXHAUST HEAT RECOVERY APPARATUS HAVING THE HEAT EXCHANGER

(71) Applicant: SANGO CO., LTD., Miyoshi-shi, Aichi-ken (JP)

(72) Inventors: Kazunari Matsuura, Toyota (JP); Masahiro Shirai, Handa (JP); Toshiya Tokuda, Nagoya (JP); Hisashi Nishino, Nagakute (JP); Yuuichi Kaido, Okazaki (JP)

(73) Assignee: SANGO CO., LTD., Miyoshi-Shi, Aichi-Ken (JP)

( * ) Notice: Subject to any disclaimer, the term of this patent is extended or adjusted under 35 U.S.C. 154(b) by 5 days.

(21) Appl. No.: 15/324,374

(22) PCT Filed: Feb. 18, 2016

(86) PCT No.: PCT/JP2016/054697
§ 371 (c)(1),
(2) Date: Jan. 6, 2017

(87) PCT Pub. No.: WO2016/140068
PCT Pub. Date: Sep. 9, 2016

(65) Prior Publication Data
US 2017/0362988 A1 Dec. 21, 2017

(30) Foreign Application Priority Data
Mar. 4, 2015 (JP) .................................. 2015-042625

(51) Int. Cl.
*F01N 5/02* (2006.01)
*F01N 13/08* (2010.01)
(Continued)

(52) U.S. Cl.
CPC ............... *F01N 5/02* (2013.01); *F01N 13/08* (2013.01); *F01P 11/04* (2013.01); *F28D 7/1692* (2013.01);
(Continued)

(58) Field of Classification Search
CPC .. F01N 5/02; F01N 13/08; F01P 11/04; F28D 9/0031; F28D 21/0003; F28D 7/1692; F25D 2021/0068
See application file for complete search history.

(56) References Cited

U.S. PATENT DOCUMENTS

2008/0314569 A1   12/2008  Yamazaki et al.
2009/0044525 A1*   2/2009  Husges .................. F02M 26/26
                                                         60/321
(Continued)

FOREIGN PATENT DOCUMENTS

JP   2008-157211 A   7/2008
JP   2009002239 A    1/2009
(Continued)

OTHER PUBLICATIONS

International Search Report (PCT/ISA/210) dated May 17, 2016, by the Japanese Patent Office as the International Searching Authority for International Application No. PCT/JP2016/054697.
(Continued)

*Primary Examiner* — Patrick D Maines
(74) *Attorney, Agent, or Firm* — Buchanan Ingersoll & Rooney PC

(57) ABSTRACT

A heat exchanger comprises a plurality of heat exchange segments juxtaposed in a housing, and a plug member connected fluid-tightly to the housing, and supporting the heat exchange segments to provide a coolant or cooling medium passage in each gap between the heat exchange segments adjacent to each other. Each heat exchange seg-
(Continued)

ment comprises a case having an opening only on a surface of the case, at least outside of the opening being plugged fluid-tightly by the plug member, and a guide member, e.g., fin accommodated in the case, and provided with a plurality of passages allowing only gas flow in a predetermined direction, and gas intake passages and gas exhaust passages at the upstream and downstream thereof, wherein an opening of the case is provided with a gas inlet port communicated with the gas intake passage, and a gas outlet port communicated with the gas exhaust passages.

17 Claims, 9 Drawing Sheets

(51) Int. Cl.

| | |
|---|---|
| F01P 11/04 | (2006.01) |
| F28F 1/40 | (2006.01) |
| F28F 9/00 | (2006.01) |
| F28F 27/02 | (2006.01) |
| F28F 3/02 | (2006.01) |
| F28F 3/04 | (2006.01) |
| F28F 3/06 | (2006.01) |
| F28F 9/007 | (2006.01) |
| F28F 9/02 | (2006.01) |
| F28D 7/16 | (2006.01) |
| F28D 9/00 | (2006.01) |
| F28D 21/00 | (2006.01) |

(52) U.S. Cl.
CPC ....... *F28D 9/0031* (2013.01); *F28D 21/0003* (2013.01); *F28F 1/40* (2013.01); *F28F 3/025* (2013.01); *F28F 3/042* (2013.01); *F28F 3/06* (2013.01); *F28F 9/001* (2013.01); *F28F 9/005* (2013.01); *F28F 9/007* (2013.01); *F28F 9/0265* (2013.01); *F28F 27/02* (2013.01); *F01N 2240/02* (2013.01); *F01N 2410/00* (2013.01); *F01P 2060/18* (2013.01); *F28D 9/0068* (2013.01); *F28F 2240/00* (2013.01)

(56) References Cited

U.S. PATENT DOCUMENTS

| | | | | |
|---|---|---|---|---|
| 2012/0017575 A1* | 1/2012 | Sloss | ......................... | F01N 5/02 60/320 |
| 2013/0061584 A1* | 3/2013 | Gerges | ..................... | F01N 5/02 60/320 |
| 2014/0251579 A1* | 9/2014 | Sloss | ......................... | F01N 5/02 165/96 |
| 2015/0219236 A1* | 8/2015 | Seon | ......................... | F16K 1/30 165/297 |

FOREIGN PATENT DOCUMENTS

| | | | | |
|---|---|---|---|---|
| JP | 2012-132614 A | 7/2012 | | |
| JP | 2013-213424 A | 10/2013 | | |
| JP | 2014-194296 A | 10/2014 | | |
| JP | 2015-25405 A | 2/2015 | | |
| JP | 2015094356 A | * | 5/2015 | ............... F01P 3/00 |

OTHER PUBLICATIONS

Written Opinion (PCT/ISA/237) dated May 17, 2016, by the Japanese Patent Office as the International Searching Authority for International Application No. PCT/JP2016/054697.

Office Action issued by the Japanese Patent Office dated Dec. 4, 2018 in corresponding Japanese Patent Application No. 2016-558832, and English language translation of Office Action (7 pages).

* cited by examiner

HEAT EXCHANGER, AND EXHAUST HEAT RECOVERY APPARATUS HAVING THE HEAT EXCHANGER

TECHNICAL FIELD

The present invention relates to a heat exchanger and an exhaust heat recovery apparatus having the heat exchanger, particularly the heat exchanger and exhaust heat recovery apparatus appropriate for an internal combustion engine.

BACKGROUND ART

In order to comply with requirements to improve energy efficiency, counter measures are proposed to recover heat of gas exhausted to the atmosphere, i.e., exhaust heat, and reuse it in various industries. Particularly, in a field of an automobile having an internal combustion engine, in order to improve a total heat efficiency, it is getting popular that an exhaust heat recovery apparatus for recovering heat of the exhaust gas from the internal combustion engine is installed in an exhaust pipe, and cooling medium or coolant heated by heat exchanging with the exhaust heat is used for accelerating the warming up of the engine, or improving the heating performance. For example, Patent document 1 discloses such an exhaust heat recovery apparatus "that is provided with a heat exchanger for heat exchanging with the exhaust gas, a bypass passage for the exhaust gas to bypass the heat exchanger, and a valve member for opening or closing the bypass passage, wherein a temperature-operated actuator which comes into contact with medium immediately after it was discharged from the heat exchanger, so that the temperature-operated actuator is elongated when the temperature of the medium is equal to or higher than a predetermined value, to open the valve member" (described in paragraph (0008) of Patent document 1).

Furthermore, with respect to the exhaust heat recovery apparatus as described above, such a structure is disclosed in Patent document 1 "that an inlet cone, an outlet cone, a bypass vale and a heat exchanger are fitted into each other and fixed air-tightly by welding or the like, and that the bypass pipe and an upstream end portion of the heat exchanger are fitted into the inlet cone, whereas the bypass pipe and a downstream end portion of the heat exchanger are fitted into the outlet cone" (described in paragraph (0013) of Patent document 1, with reference numerals as indicated therein being omitted). With respect to the heat exchanger, it is further described "that in a casing, 9 heat-transfer pipes having flat cross section are fluid-tightly fixed to partition plates, into which their opposite end portions are penetrated", and "that between two partition plates, a water jacket for the medium flowing therein is formed by the inner surface of the casing and the outer surfaces of the heat-transfer pipes" (described in paragraph (0014), with reference numerals as indicated therein being omitted).

Also, Patent document 2 discloses such a heat exchanger "that a plurality of heat-transfer tubes for flowing exhaust gas therein are stacked one over another, and the heat-transfer tubes are accommodated in a core case, which is provided with an inlet port for introducing a medium and an outlet port for discharging the medium warmed in the heat-transfer tubes, so that the medium is flowed from the inlet port toward the outlet port, and the exhaust gas is flowed into the heat-transfer tubes, whereby the medium flowed through the outer periphery of the heat-transfer tubes is warmed by the heat of the exhaust gas. At least 3 heat-transfer tubes are stacked one over another, and, with the heat-transfer tubes equal to or more than 3 being stacked one over another, the passages, which are formed between the upper surfaces of the heat-transfer tubes and the core case, between the heat-transfer tubes adjacent to each other, and between the lower surfaces of the heat-transfer tubes and the core case, are formed into 4 and more layers as viewed in cross section, so that passages between layers for the medium being transferred to another layer are formed between the side surfaces of the heat-transfer tubes and the core case." And, such a configuration as to "close any passage between layers by a passage closing means" is proposed (described in paragraph (0009) of Patent document 2).

Furthermore, Patent document 2 discloses such a configuration "that an exhaust heat recovery apparatus comprises an introducing member, to which exhaust gas generated from an internal combustion engine is introduced, a heat exchanger, which is connected with the introducing member through an upper passage, and a tip end of which is supported by a gas introducing member, a gas discharging member, which is connected to a rear end of the heat exchanger, and in which the exhaust gas passed through the heat exchanger is flowed, a lower passage, which is disposed below the heat exchanger, and in which the exhaust gas that is not flowed into the upper passage, is flowed, a thermo-actuator, which is supported by an actuator support portion at a medium discharging portion, to be actuated by a medium temperature, and a valve mechanism, which is disposed at a tip end of the actuator to adjust the amount of exhaust gas flowed in the upper passage" (described in paragraph (0032) of Patent document 2, with reference numerals as indicated therein being omitted).

PRIOR ART DOCUMENT

Patent Document

Patent document 1: Japanese Patent Laid-open Publication No. 2008-157211
Patent document 2: Japanese Patent Laid-open Publication No. 2012-132614

SUMMARY OF THE INVENTION

Problems to be Solved by the Invention

With respect to the heat exchanger as disclosed in the above Patent documents, "9 heat-transfer pipes" are used in Patent document 1, and when the heat exchanger is applied to the exhaust heat recovery apparatus, it is so configured "that the bypass pipe and an upstream end portion of the heat exchanger are fitted into the inlet cone, whereas the bypass pipe and a downstream end portion of the heat exchanger are fitted into the outlet cone". And, the heat exchanger with "the heat-transfer tubes equal to or more than 3" is used in Patent document 2, and when the heat exchanger is applied to the exhaust heat recovery apparatus, it is so configured to comprise "an introducing member, to which exhaust gas generated from an internal combustion engine is introduced, a heat exchanger, which is connected with the introducing member through an upper passage, and a tip end of which is supported by a gas introducing member, a gas discharging member, which is connected to a rear end of the heat exchanger, and in which the exhaust gas passed through the heat exchanger is flowed".

Both of the heat exchangers as disclosed in the above Patent documents 1 and 2 are provided at their opposite ends with the "inlet cone" or "introducing member" to introduce the exhaust gas, and the "outlet cone" or "gas discharging member" to discharge the exhaust gas, so that they are configured by three members including a main body portion, respectively. Therefore, a further miniaturizing is required for the heat exchanger. Furthermore, in order to introduce the exhaust gas equally to the heat exchanger, countermeasures including those against fore and rear members fixed to it are to be taken, which result in a complex structure, as proposed in Patent document 2, so that they will not be easily taken. Furthermore, only miniaturizing the heat exchanger does not automatically result in miniaturizing the exhaust heat recovery apparatus, and assembling those and so on are not easily performed.

With respect to the exhaust heat recovery apparatus installed in the internal combustion engine, when a cold start is made in the case where the internal combustion engine and coolant are cold, it is necessary to warm up the coolant immediately, so that a heat loss at the bypass passage for introducing the exhaust gas is to be reduced as low as possible. As the above-described "inlet cone" or "introducing member" is large in heat capacity, its mass and surface are required to be reduced. Also, when it is installed in the automobile, further miniaturizing the apparatus as a whole has been required. Furthermore, in view of the efficient heat exchange of the heat exchanger with the coolant, the heat exchangers and exhaust heat recovery apparatuses as disclosed in Patent documents 1 and 2 may not fulfill recent requirements for their performances. Therefore, it is an urgent issue to minimize a heat mass (heat capacity) and space occupied by the bypass passage in particular, maintaining a desired heat exchanging efficiency.

According to the present invention, therefore, with respect to a heat exchanger for performing a heat exchange between exhaust gas and cooling medium, it is an object to enable a further miniaturization with small number of parts.

Also, the present invention relates to an exhaust heat recovery apparatus, which recovers an exhaust heat by heat exchanging exhaust gas passing through a bypass passage of an internal combustion engine with cooling medium in a heat exchanger, and it is an object of the invention to provide a small exhaust heat recovery apparatus which may perform an efficient heat recovery, by appropriately configuring the heat exchanger including the bypass passage.

Means for Solving the Problems

To solve the above-described problems, the present invention relates to a heat exchanger for heat exchanging in a housing between exhaust gas and cooling medium, which comprises a plurality of heat exchange segments juxtaposed in the housing, and a plug member connected fluid-tightly to the housing, and supporting the plurality of heat exchange segments to provide coolant passages in each of the gaps between the heat exchange segments adjacent to each other, wherein each heat exchange segment comprises a case having an opening only on a surface of the case, at least outside of the opening being plugged fluid-tightly by the plug member, and a guide member accommodated in the case, and provided with a plurality of passages allowing gas flow in only a predetermined direction, and gas intake passages and gas exhaust passages at upstream and downstream of the plurality of passages, and wherein the opening of the case of each segment is provided with a gas inlet port communicated with the gas intake passages, and a gas outlet port communicated with the gas exhaust passages. For example, the case may be formed in a rectangular parallelepiped shape with only its longitudinal surface being opened. In this case, the predetermined direction means the longitudinal direction.

In the above-described heat exchanger, the guide member of each heat exchange segment may comprise a fin formed by a heat exchange plate in a wave shape having a continuous S-like cross section, wherein a side surface of the fin in an extending direction closes the opening of the case between the gas inlet port and the gas outlet port, and wherein opposite end faces of the fin communicate with the gas inlet port and the gas outlet port, respectively.

Furthermore, the above-described heat exchanger may further comprise a coolant inlet port and a coolant outlet port formed in the housing to be communicated with the coolant passages, and a flow guide plate disposed between the coolant inlet port and the coolant outlet port. The flow guide plate may possess a comb-shaped form, and it may be so configured that a part of teeth configuring the comb-shaped form is disposed in each gap between the plurality of heat exchange segments adjacent to each other. Furthermore, the flow guide plate may have a bent portion with a tip end of a part of the teeth configuring the comb-shaped form being bent, the bent portion providing a coolant guide passage to said each gap.

Also, in the above-described heat exchanger, each case of the plurality of heat exchange segments may have at least a protruded portion at the same position of each side surface of the cases adjacent to each other, and the protruded portion may be disposed within the coolant passage.

Furthermore, in the above-described heat exchanger, the plug member may have a plurality of slits formed in parallel with each other, and it may be so configured that the openings of the cases are fitted into the slits at the outside of the openings respectively, to support the plurality of heat exchange segments.

And, an exhaust heat recovery apparatus according to the present invention comprises a main exhaust passage into which is introduced exhaust gas from an internal combustion engine, a bypass passage branched off from a part of the main exhaust passage to provide a gas inlet port, and merged into another part of the main exhaust passage to provide a gas outlet port, and a heat exchanger for heat exchanging with the exhaust gas passing through the bypass passage to recover exhaust heat, wherein the heat exchanger comprises a plurality of heat exchange segments juxtaposed in the housing, and a plug member connected fluid-tightly to the housing, the plug member supporting the plurality of heat exchange segments to provide coolant passages in each gap between the heat exchange segments adjacent to each other, each heat exchange segment configuring the plurality of heat exchange segments, comprising a case having an opening on only one surface of the case, at least outside of the opening being plugged fluid-tightly by the plug member, and a guide member accommodated in the case, the guide member having a plurality of passages allowing only gas flow in a predetermined direction, and gas intake passages and gas exhaust passages at upstream and downstream of the plurality of passages, wherein the opening of the case of each segment is provided with a gas inlet port communicated with the gas intake passages to configure the gas inlet port of the bypass passage, and a gas outlet port communicated with the gas exhaust passages to configure the gas outlet port of the bypass passage.

In the above-described exhaust heat recovery apparatus, the guide member of each heat exchange segment may comprise a fin formed by a heat exchange plate in a wave shape having a continuous S-like cross section, and it may be so configured that a side surface of the fin in an extending direction closes the opening of the case between the gas inlet port and the gas outlet port, and wherein opposite end faces of the fin communicate with the gas inlet port and the gas outlet port, respectively.

The heat exchanger for use in the above-described exhaust heat recovery apparatus may further comprise a coolant inlet port and a coolant outlet port formed in the housing to be communicated with the coolant passages, and a flow guide plate disposed between the coolant inlet port and the coolant outlet port, and it may be so configured that the flow guide plate possesses a comb-shaped form, and that a part of teeth configuring the comb-shaped form is disposed in each gap between the plurality of heat exchange segments adjacent to each other. Furthermore, the flow guide plate may have a bent portion with a tip end of a part of the teeth configuring the comb-shaped form being bent, the bent portion providing a coolant guide passage to said each gap.

In the heat exchanger for use in the above-described exhaust heat recovery apparatus, each case of the plurality of heat exchange segments may have at least a protruded portion at the same position of each side surface of the cases adjacent to each other, and it may be so configured that the protruded portion is disposed within the coolant passage. Also, the housing of the heat exchanger may configure an upper housing placed above the main exhaust passage with the opening being positioned below, and it may be so configured that a lower housing is connected to the upper housing to form an enclosure shape, the main exhaust passage being provided within the lower housing.

It may further comprise a valve device opening or closing communication between the main exhaust passage and the bypass passage, the valve device being provided with at least a valve member accommodated in the lower housing, a branch section branching off from the main exhaust passage into the bypass passage, and a merged section merged into the main exhaust passage from the bypass passage through the valve member.

The above-described valve device may comprise a first valve member opening or closing the main exhaust passage, a second valve member opening or closing the bypass passage, a single shaft member supporting the first valve member and second valve member, and a holding member holding the shaft member to be enclosed in the holding member, the holding member being supported on at least one side surface of the lower housing.

Furthermore, the second valve member may be disposed to open or close the bypass passage at the merged section, and the second valve member may be disposed to close the bypass passage and shield the holding member against the main exhaust passage, when the first valve member opens the main exhaust passage.

Then, it may further comprise a bracket secured to at least one of the upper housing and the lower housing, wherein the valve device is provided with an actuator for driving the shaft member to be rotated, and it may be so configured that the actuator is supported on the bracket, and the holding member is fitted into the bracket.

Effects of the Invention

As the present invention is configured as described above, the following effects can be achieved. That is, the present invention is a heat exchanger for heat exchanging in a housing between exhaust gas and cooling medium, which comprises a plurality of heat exchange segments juxtaposed in the housing, and a plug member connected fluid-tightly to the housing, and supporting the plurality of heat exchange segments to provide coolant passages in each of the gaps between the heat exchange segments adjacent to each other, wherein each heat exchange segment comprises a case having an opening only on a surface of the case, at least outside of the opening being plugged fluid-tightly by the plug member, and a guide member accommodated in the case, and provided with a plurality of passages allowing gas flow in only a predetermined direction, and gas intake passages and gas exhaust passages at upstream and downstream of the plurality of passages, and wherein the opening of the case of each segment is provided with a gas inlet port communicated with the gas intake passages, and a gas outlet port communicated with the gas exhaust passages, whereby efficient heat exchange may be made with a necessary space being made as small as possible, so that a further miniaturization can be made.

In the above-described heat exchanger, if it is so configured that the guide member of each heat exchange segment comprises a fin formed by a heat exchange plate in a wave shape having a continuous S-like cross section, wherein a side surface of the fin in an extending direction closes the opening of the case between the gas inlet port and the gas outlet port, and wherein opposite end faces of the fin communicate with the gas inlet port and the gas outlet port, respectively, the guide member with an appropriate heat exchanging efficiency may be easily assembled into each heat exchange segment.

Furthermore, in the above-described heat exchanger, if it is so configured to comprise a coolant inlet port and a coolant outlet port formed in the housing to be communicated with the coolant passages, and a flow guide plate disposed between the coolant inlet port and the coolant outlet port, the heat exchange may be performed efficiently, with the coolant being smoothly circulated. If the flow guide plate possess a comb-shaped form, and it is so configured that a part of teeth configuring the comb-shaped form is disposed in each gap between the plurality of heat exchange segments adjacent to each other, the coolant may be circulated appropriately and smoothly in each heat exchange segment. Furthermore, if the flow guide plate has a bent portion with a tip end of a part of the teeth configuring the comb-shaped form being bent, wherein the bent portion provides a coolant guide passage to said each gap, the heat exchange may be performed equally in each heat exchange segment, to perform the heat exchange efficiently.

Also, if each case of the plurality of heat exchange segments has at least a protruded portion at the same position of each side surface of the cases adjacent to each other, and it is so configured that the protruded portion is disposed within the coolant passage, air bubbles mixed in the coolant may be surely separated between the opposing protruded portions to circulate the coolant appropriately and smoothly. Furthermore, if the plug member has a plurality of slits formed in parallel with each other, and it is so configured that the openings of the cases are fitted into the slits at the outside of the openings respectively, to support the plurality of heat exchange segments, the case of each heat exchange segment may be fluid-tightly plugged easily and appropriately.

Then, in the exhaust heat recovery apparatus according to the present invention, as it comprises a main exhaust passage into which is introduced exhaust gas from an internal combustion engine, a bypass passage branched off from a part of the main exhaust passage to provide a gas inlet port, and merged into another part of the main exhaust passage to provide a gas outlet port, and a heat exchanger for heat exchanging with the exhaust gas passing through the bypass passage to recover exhaust heat, as configured before, and the gas inlet port and gas outlet port formed in each opening of the case configure the gas inlet port and gas outlet port of the bypass passage, respectively, efficient heat exchange may be made, with a heat capacity of the bypass passage and a space required for it being made as small as possible, so that a further miniaturization of not only the heat exchanger but also the exhaust heat recovery apparatus as a whole can be made.

In the above-described exhaust heat recovery apparatus, if the guide member of each heat exchange segment comprises a fin formed by a heat exchange plate in a wave shape having a continuous S-like cross section, and it is so configured that a side surface of the fin in an extending direction closes the opening of the case between the gas inlet port and the gas outlet port, and wherein opposite end faces of the fin communicate with the gas inlet port and the gas outlet port, respectively, the guide member with an appropriate heat exchanging efficiency may be easily assembled into each heat exchange segment.

If the heat exchanger for use in the above-described exhaust heat recovery apparatus has a coolant inlet port and a coolant outlet port formed in the housing to be communicated with the coolant passages, and a flow guide plate disposed between the coolant inlet port and the coolant outlet port, and if it is so configured that the flow guide plate possesses a comb-shaped form, and that a part of teeth configuring the comb-shaped form is disposed in each gap between the plurality of heat exchange segments adjacent to each other, the coolant may be circulated appropriately and smoothly in each heat exchange segment, to perform the heat recovery efficiently. Furthermore, if the flow guide plate has a bent portion with a tip end of a part of the teeth configuring the comb-shaped form being bent, with the bent portion providing a coolant guide passage to said each gap, the heat exchange may be performed equally in each heat exchange segment, to perform the heat recovery efficiently.

Also, if each case of the plurality of heat exchange segments has at least a protruded portion at the same position of each side surface of the cases adjacent to each other, and it is so configured that the protruded portion is disposed within the coolant passage, air bubbles mixed in the coolant may be surely separated between the opposing protruded portions to circulate the coolant appropriately and smoothly.

Also, in the above-described exhaust heat recovery apparatus, if the housing of the heat exchanger configures an upper housing placed above the main exhaust passage with the opening being positioned below, and it is so configured that a lower housing is connected to the upper housing to form an enclosure shape, with the main exhaust passage being provided within the lower housing, the heat exchanger may be installed in the main exhaust passage easily and appropriately.

Furthermore, if it comprises a valve device opening or closing communication between the main exhaust passage and the bypass passage, the valve device being provided with at least a valve member accommodated in the lower housing, a branch section branching off from the main exhaust passage into the bypass passage, and a merged section merged into the main exhaust passage from the bypass passage through the valve member, changing the exhaust gas flow between the main exhaust passage and bypass passage may be performed easily and appropriately.

Also, if the valve device comprises a first valve member opening or closing the main exhaust passage, a second valve member opening or closing the bypass passage, a single shaft member supporting the first valve member and second valve member, and a holding member holding the shaft member to be enclosed in the holding member, with the holding member being supported on at least one side surface of the lower housing, the shaft member may be protected by the holding member appropriately.

Particularly, if the second valve member is disposed so as to open or close the bypass passage at the merged section, and the second valve member is disposed to close the bypass passage and shield the holding member against the main exhaust passage, when the first valve member opens the main exhaust passage, the shaft member may be protected appropriately against the high temperature exhaust gas in the main exhaust passage.

And, if it comprises a bracket secured to at least one of the upper housing and the lower housing, wherein the valve device is provided with an actuator for driving the shaft member to be rotated, and it is so configured that the actuator is supported on the bracket, and the holding member is fitted into the bracket, the shaft member may be surely rotated, with the actuator being protected against high temperature members appropriately.

EMBODIMENTS FOR CARRYING OUT THE INVENTION

Figure 1:
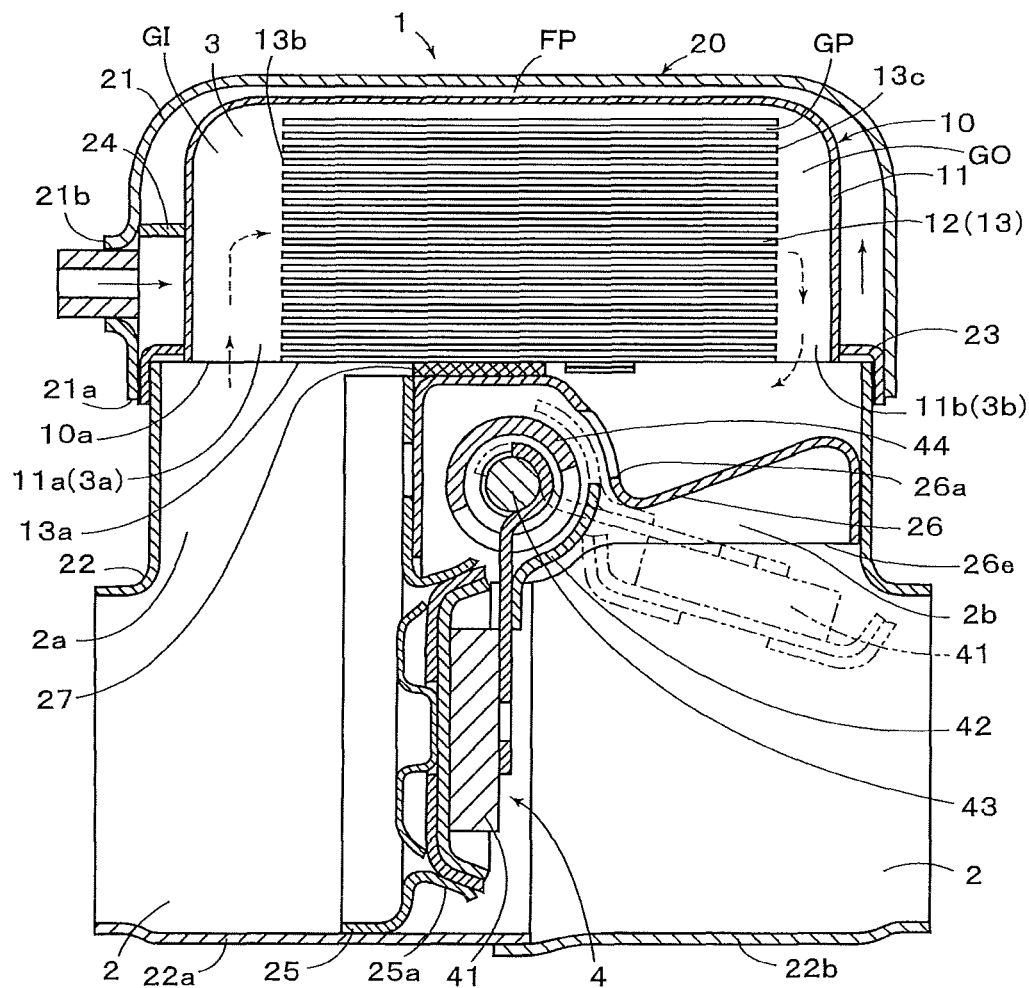
FIG. 1 is a lateral sectional view of an exhaust heat recovery apparatus having a heat exchanger according to an embodiment of the present invention.
Figure 2:
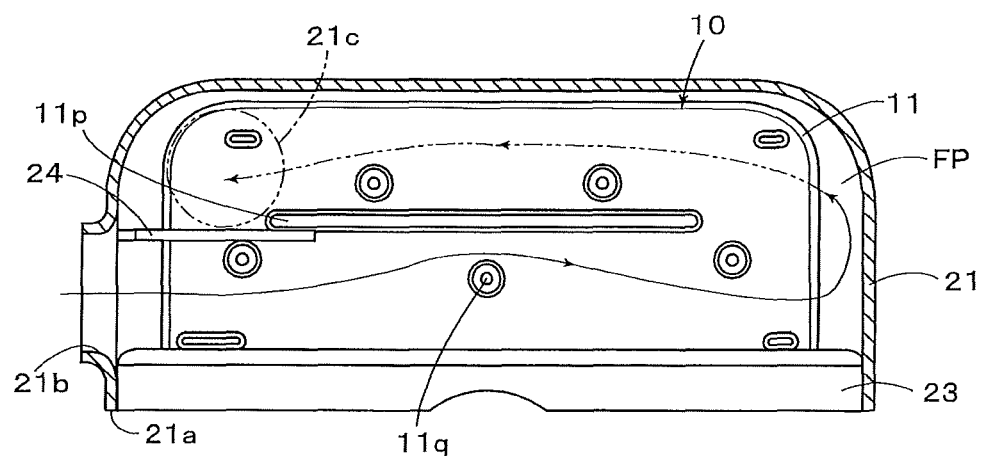
FIG. 2 is a partially sectioned view showing coolant flow in a heat exchanger according to an embodiment of the present invention.
Figure 3:
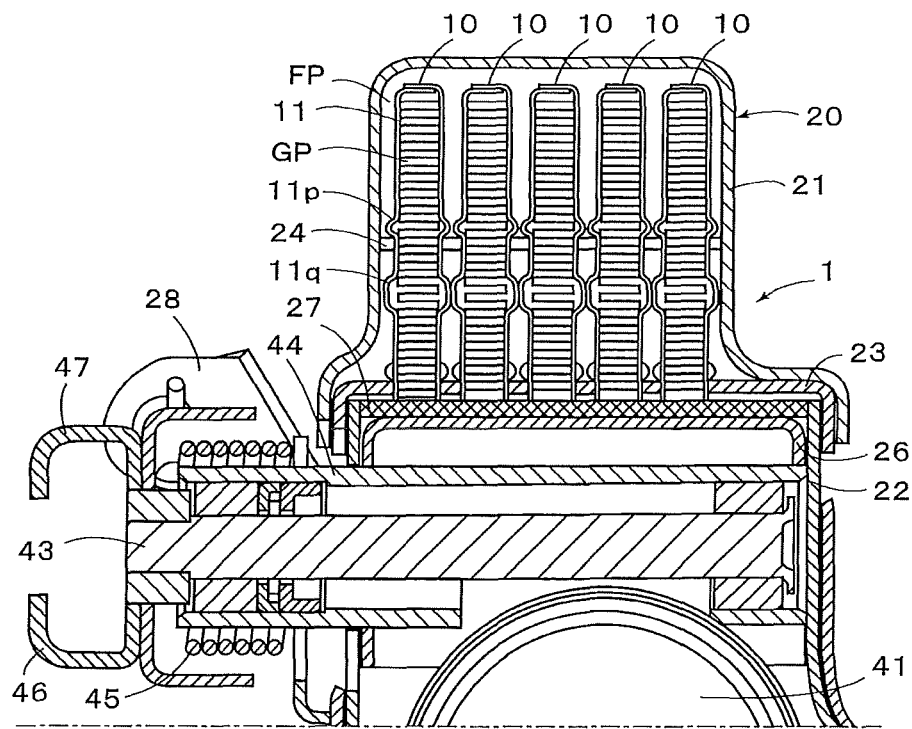
FIG. 3 is a longitudinal sectional view of an exhaust heat recovery apparatus according to an embodiment of the present invention.

Hereinafter, will be explained desirable embodiments of the present invention referring to drawings. FIGS. 1-3 show an exhaust heat recovery apparatus having a heat exchanger 1 according to an embodiment of the present invention. The exhaust heat recovery apparatus has a main exhaust passage 2 introducing therein exhaust gas from an internal combustion engine (not shown), a bypass passage 3 branched off from the main exhaust passage 2 and merged into the main exhaust passage 2, and the heat exchanger 1 for heat exchanging with the exhaust gas passing through the bypass passage 3 to recover exhaust heat. According to the present embodiment, a housing 20 of the exhaust heat recovery apparatus is formed in a case shape by an upper housing 21, which is placed above the main exhaust passage 2 (in such a state to be mounted on a vehicle), and a lower housing 22, which is connected to the upper housing 21, and the housings 21 and 22 are separated fluid-tightly by a plug member 23. In the present embodiment, two members 22a and 22b are connected together to form the lower housing 22. Furthermore, a valve device 4 is installed to open or close the communication between the main exhaust passage 2 and the bypass passage 3. At the outset, the heat exchanger 1 will be explained hereinafter.

The heat exchanger 1 of the present embodiment has a housing thereof configured by the upper housing 21 of the exhaust heat recovery apparatus, and a plurality of (five in the present embodiment) heat exchange segments (represented by "10"), as shown in FIGS. 1-7. Each heat exchange segment 10 is configured by a case 11 having an opening on only one surface thereof and a guide member 12 accommodated in the case 11. According to the present embodiment, the case 11 is formed in a rectangular parallelepiped shape with its elongated lower planar surface portion being opened. Instead, it may be formed in a rectangular parallelepiped shape, with its opposite side, surfaces being square, and its elongated lower planar surface portion being opened, for example. Or, it may be formed with an arc-shaped curved surface upward in FIG. 1, and may be formed with its opposite side surfaces being semicircular, and its elongated lower planar surface portion being opened.

Each guide member 12 is configured to have a plurality of passages (GP), which allow gas flow in only a predetermined direction (longitudinal direction of the case 11 according to the present embodiment), and gas intake passages (GI) and gas exhaust passages (GO) at their upstream and downstream, so that an opening of each case 11 is provided with a gas inlet port 11a which is communicated with the gas intake passage (GI), and a gas outlet port 11b which is communicated with the gas exhaust passages (GO). Five heat exchange segments 10 as described above are placed in parallel with a predetermined gap being spaced each other, and enclosed by the upper housing 21, which has an opening 21a at the same side surface as the opening surface 10a of each heat exchange segment 10. Accordingly, the five heat exchange segments 10 are accommodated in the upper housing 21, so that the gas inlet port 3a and gas outlet port 31b of the bypass passage 3 are configured respectively by the gas inlet port 11a and gas outlet port 11b, which are provided at the fore and back of each heat exchange segment 10 in the predetermined direction (longitudinal direction of the case 11).

Figure 5:
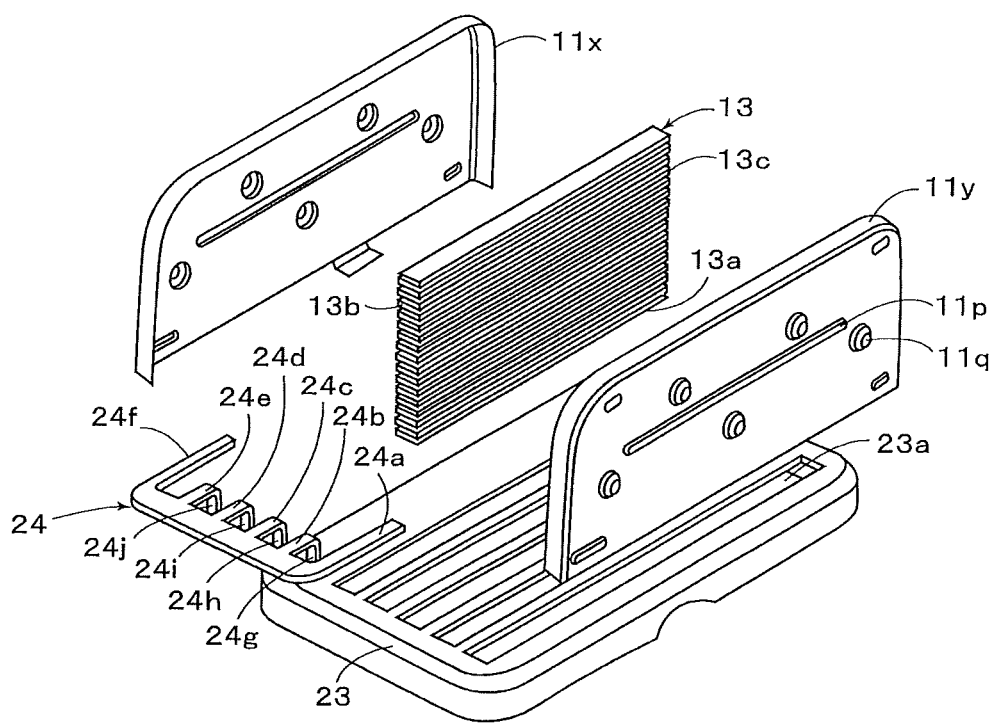
FIG. 5 is a perspective view of parts configuring a heat exchange segment for use in an embodiment of the present invention, before they are assembled.
Figure 6:
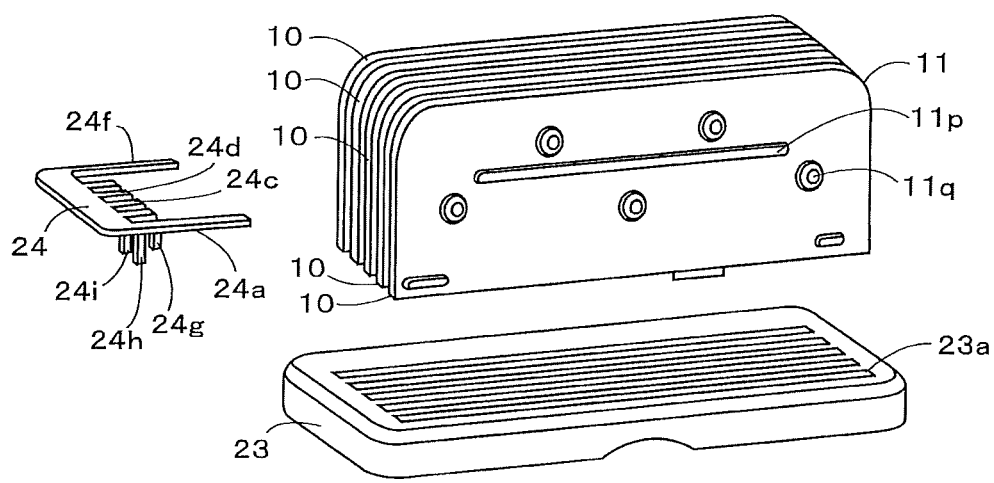
FIG. 6 is a perspective view showing an assembled state of a heat exchange segment and a flow guide plate for use in an embodiment of the present invention.
Figure 7:
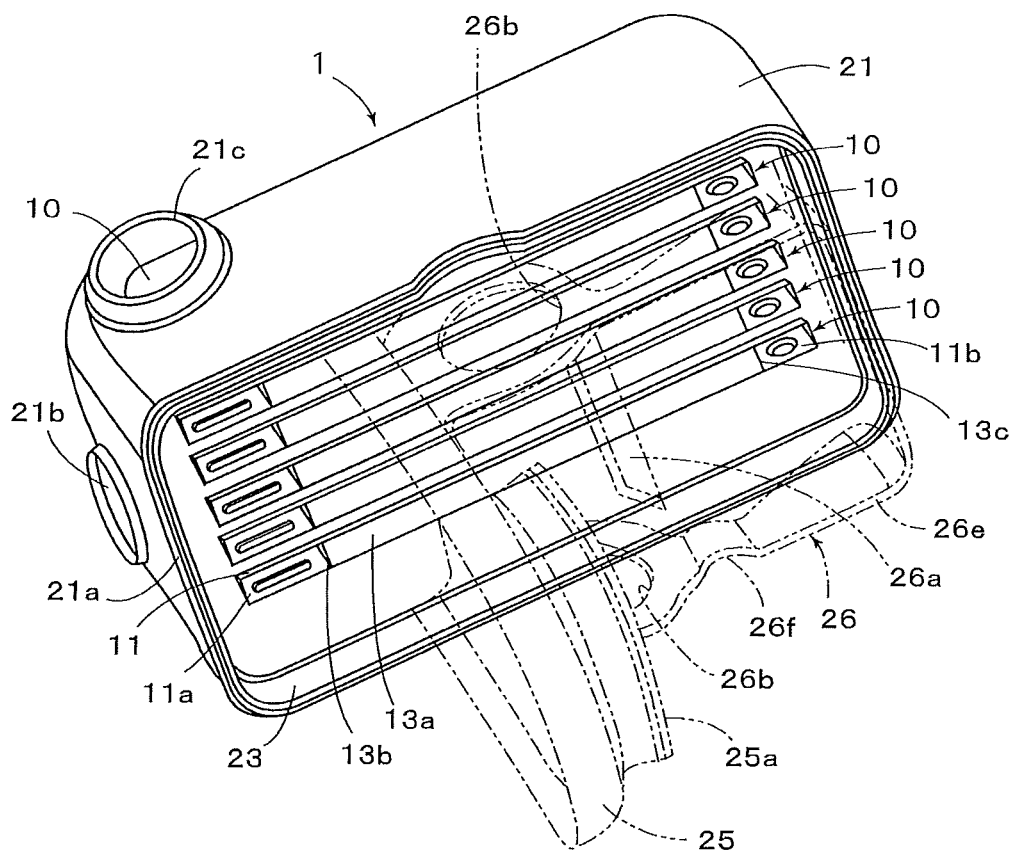
FIG. 7 is a perspective view of a heat exchange segment as viewed from an opening of a housing, according to an embodiment of the present invention.

The above-described heat exchanger 1 has the plug member 23 which separates fluid-tightly within the upper housing 21, and plugs fluid-tightly at least outside of the opening of the case 11. The plug member 23 is formed with five slits (represented by 23a) in parallel with each other, as shown in FIGS. 5 and 6. Each of the heat exchange segments 10 is fitted into a respective one of the slits 23a, to be supported as shown in FIGS. 1 and 2 (and shown in FIGS. 11 and 12 as described later). Therefore, coolant passages (FP) are formed between the outer surfaces of the five heat exchange segments 10 and the inner surfaces of the upper housing 21 and plug member 23, and between the cases 11, 11 of the heat exchange segments 10 adjacent to each other. According to the upper housing 21 of the present embodiment as shown in FIGS. 2 and 7 (and FIG. 13 described later), a coolant inlet port 21b with coolant being fed into the coolant passage (FP) is placed lower (in such a state as to be mounted on the vehicle) than a coolant outlet port 21c with coolant being discharged from the coolant passage (FP), and a flow guide plate 24 is disposed between the coolant inlet port 21b and the coolant outlet port 21c.

The flow guide plate 24 possesses a comb-shaped form as shown in FIGS. 5 and 6. Out of comb teeth 24a-24f configuring the comb-shape, each of the comb teeth 24b-24e is disposed in each gap between the five heat exchange segments 10 adjacent to each other. Furthermore, tip ends of the comb teeth 24b-24e are bent to form bent portions 24g-24j, among which the bent portions 24h and 24i placed in the lateral center are set to be longest. With those bent portions 24h and 24i, the coolant guide passage to each gap between the heat exchange segments 10 is provided. Accordingly, it is so adjusted by the comb teeth 24a-24f that the coolant is high in speed at the lateral center portion of each heat exchange segment 10, and low in speed at its end portions, whereby heat exchange can be performed equally in each heat exchange segment 10.

Figure 4:
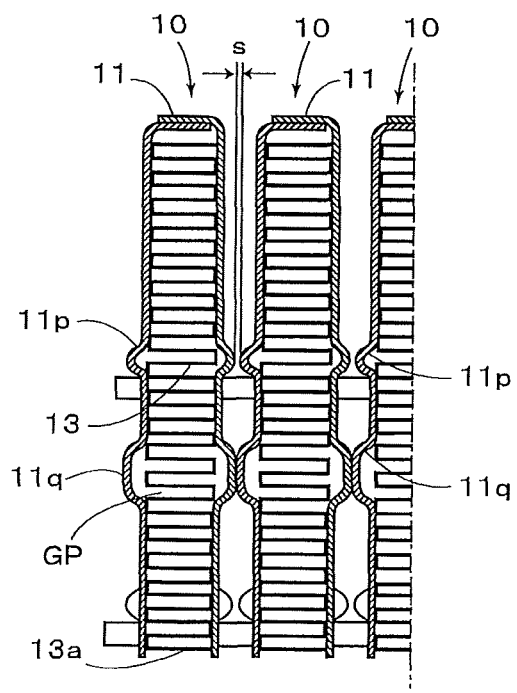
FIG. 4 is an enlarged longitudinal sectional view showing a relationship between heat exchange segments adjacent to each other according to an embodiment of the present invention.
Figure 9:
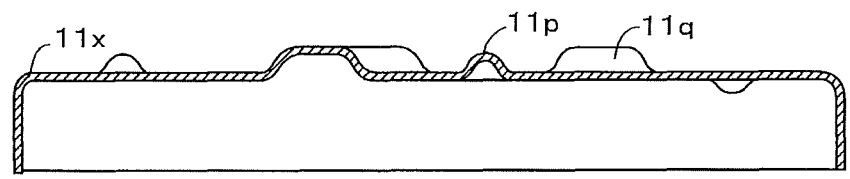
FIG. 9 is a longitudinal sectional view of a lid member configuring a case of a heat exchange segment for use in an embodiment of the present invention.

The case 11 of each heat exchange segment 10 is formed by two lid members 11x and 11y with their opened side wall portions being connected together, as shown in FIG. 5 (and FIG. 10 as described later), to be formed into the rectangular parallelepiped shape (with its elongated lower planar surface portion being opened). As shown in FIGS. 5 and 6 (and shown in FIGS. 9 and 10 as described later), at least a protruded portion 11p is formed at the same position of each side surface of the cases 11 adjacent to each other, and the protruded portion 11p is disposed within the coolant passage (FP). According to the present embodiment, in addition to the elongated protruded portion 11p which extends in the longitudinal direction, a plurality of protruded portions 11q like projections are formed. As shown in FIG. 4, between the protruded portions 11p, 11p adjacent to each other, there is formed a gap (s), where air bubbles mixed in the coolant are separated to move upward in FIG. 4. On the other hand, the protruded portions 11q, 11q adjacent to each other are contacted with each other, to define the gap between the cases 11, 11 adjacent to each other, so that the coolant is guided as indicated by solid line arrows in FIG. 1, and indicated by an arrow with solid line and two-dotted chain line in FIG. 2, to ensure the desired coolant passage (FP) together with the flow guide plate 24 as described above.

According to the present embodiment, the guide member 12 of each heat exchange segment 10 is configured by a fin 13, which is formed by a single heat exchange plate in a wave shape having a continuous S-like cross section, as shown in FIGS. 1, 3, 4 and 5. And, as shown in FIGS. 1 and 7, a side surface 13a of the fin 13 in an extending direction is positioned to close the longitudinal opening of the case 11, and opposite end faces 13b, 13c of the fin 13 are positioned to communicate with the gas inlet port 11a (therefore, the gas inlet port 3a of the bypass passage 3) and the gas outlet port 11b (therefore, the gas outlet port 3b of the bypass passage 3), respectively. Accordingly, the exhaust gas passages (GI, GP, GO) as shown in FIG. 1 are formed, so that the exhaust gas will flow as indicated by arrows of dash line. In case of connecting the lid members 11x and 11y, connecting the case 11 and fin 13, and connecting each heat exchange segment 10 to each slit 23a after the former is fitted into the latter, they are air-tightly or fluid-tightly connected appropriately by means of brazing and so on. With respect to the longitudinal opening of the case 11, in lieu of the side surface 13a in the extending direction of the fin 13, a separate member (not shown) may be connected to the case 11, or a closed portion (not shown) may be formed integrally with the case 11.

On the other hand, the valve device 4 is installed in the lower housing 22, within which the main exhaust passage 2 is provided. Therefore, a branched section 2a where the bypass passage 3 is branched off from the main exhaust passage 2, and a merged section 2b where the bypass passage 3 is merged into the main exhaust passage 2 (through a second valve member 42 as described later) are provided within the lower housing 22. As shown in FIG. 1, a partition wall member 25 having a valve seat 25a is fitted into a member 22a, and a partition wall member 26 having a through hole 26a is fitted into a member 22b, so that the branched section 2a and merged section 2b are separated by the partition wall member 25. The partition wall members 25 and 26 are joined together to be an integral member, and placed as indicated by two-dotted chain line in FIG. 7.

Figure 8:
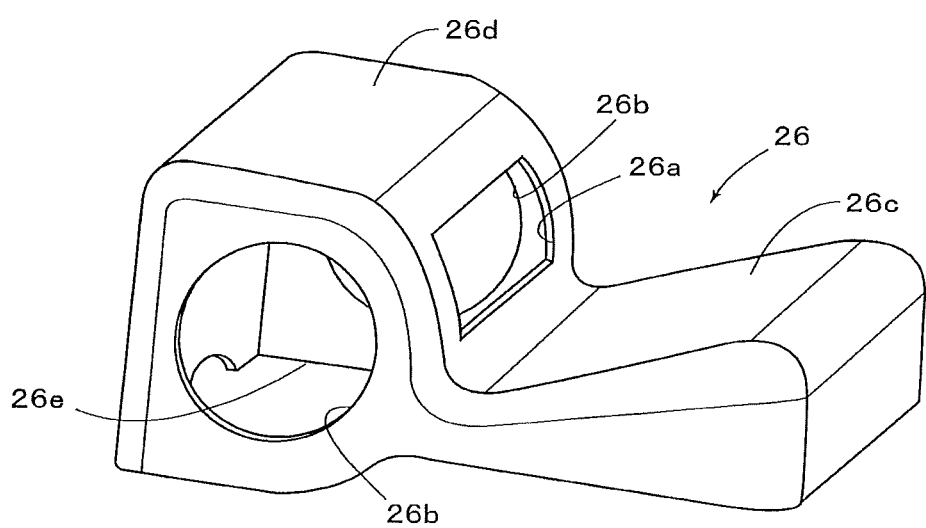
FIG. 8 is a perspective view of a partition wall member for use in an embodiment of the present invention.

The partition wall member 26 is formed in a saddle type case as shown in FIGS. 7 and 8, and formed with a through hole 26a, which is communicated with the main exhaust passage 2 at the merged section 2b, and through holes 26b, 26b, into which a holding member 44 as described later is fitted. As shown in FIG. 8, the partition wall member 26 is formed with an inclined surface portion 26c, which is placed to face with the opening surface 10a of each heat exchange segment 10, to guide the gas exhausted from each heat exchange segment 10 after the heat exchange was made toward the through hole 26a. Also, there is formed a planar surface portion 26d, in parallel with an axis connecting the centers of the through holes 26b, 26b. As shown in FIGS. 1 and 3, the planar surface portion 26d is placed to close the opening surface 10a of each heat exchange segment 10 and a center portion of the side surface 13a of the fin 13 in the extending direction thereof, so that the bypass passage 3 is separated into the gas inlet port 3a and the gas outlet port 3b.

Accordingly, the partition wall member 26 is placed with its opening 26e being opened at the downstream of the valve device 4 of the main exhaust passage 2, as shown in FIG. 1. As a result, the opposite end faces 13b, 13c of the fin 13 are communicated with the gas inlet port 11a (3a) and gas outlet port 11b (3b) respectively, as described before, so that the exhaust gas passages (GI, GP, GO) as shown in FIG. 1 are provided. Furthermore, a recessed portion 26f is formed on a side surface of the partition wall member 26 vertically as shown in FIG. 7, to serve as a groove for discharging condensed water, to which moisture in the exhaust gas is condensed.

Figure 10:
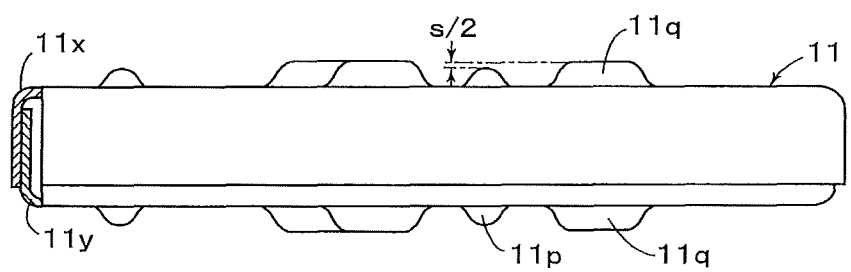
FIG. 10 is a partially sectioned front view of a case configuring a heat exchange segment for use in an embodiment of the present invention.

With respect to the heat exchanger 1 as configured above, hereinafter, an assembling process of main parts of it will be described referring to FIGS. 9-14. By connecting the lid member 11x with its cross sectional view being shown in FIG. 9 and the lid member 11y with approximately the same shape as the lid member 11x, to overlap their opened side wall portions, cross sectional view of a part of which is shown in the left part of FIG. 10, the case 11 as shown in FIG. 10 is formed. The case 11 is formed with the aforementioned longitudinal protruded portion 11p and protruded portion 11q like projection, which are different in height, with a difference in height being set to be (s/2). Then, with the fin 13 being accommodated in the case 11 as shown in FIG. 5, the lid members 11x and 11y are connected, to configure each heat exchange segment 10 as shown in FIG. 6.

Figure 11:
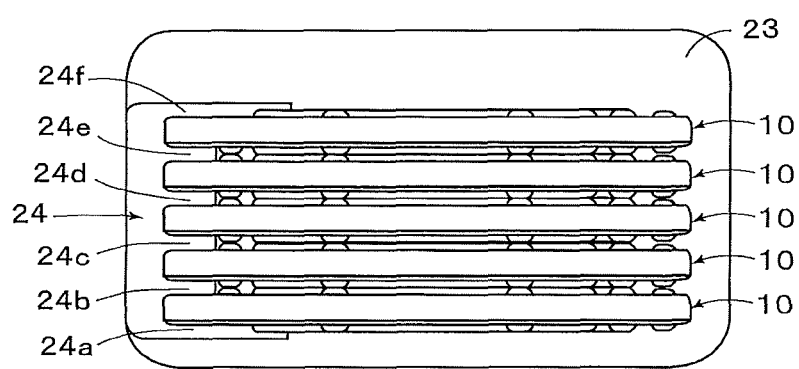
FIG. 11 is a plan view showing a state with a plurality of heat exchange segments and a flow guide plate being installed on a plug member for use in an embodiment of the present invention.
Figure 12:
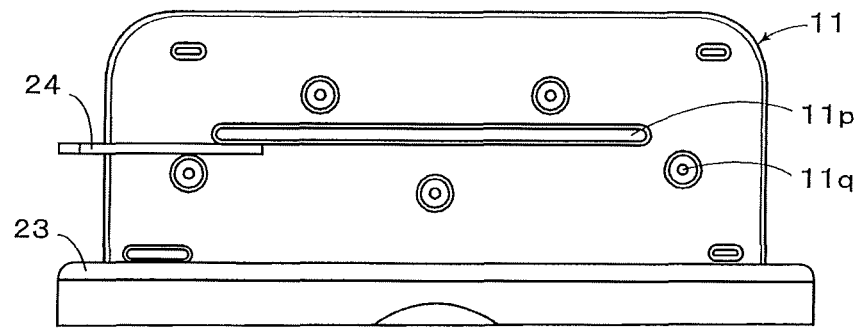
FIG. 12 is a side view showing a state with heat exchange segments and a flow guide plate being installed on a plug member for use in an embodiment of the present invention.

As shown in FIGS. 5 and 6, the plug member 23 is formed with five slits 23a, into each of which one of the heat exchange segments 10 is fitted, to support it as shown in FIGS. 11 and 12. As enlarged in FIG. 4, the gap (s) is formed between the protruded portions 11p, 11p of the cases 11 adjacent to each other. Next, each of the comb teeth 24b-24e of the flow guide plate 24 as shown in FIGS. 5 and 6 is disposed in each gap between the five heat exchange segments 10 adjacent to each other, and the teeth 24a and 24f are disposed to be positioned outside of the heat exchange segments 10 placed at the opposite sides thereof, to be accommodated in the upper housing 21, as shown in FIGS. 6 and 11.

Figure 13:
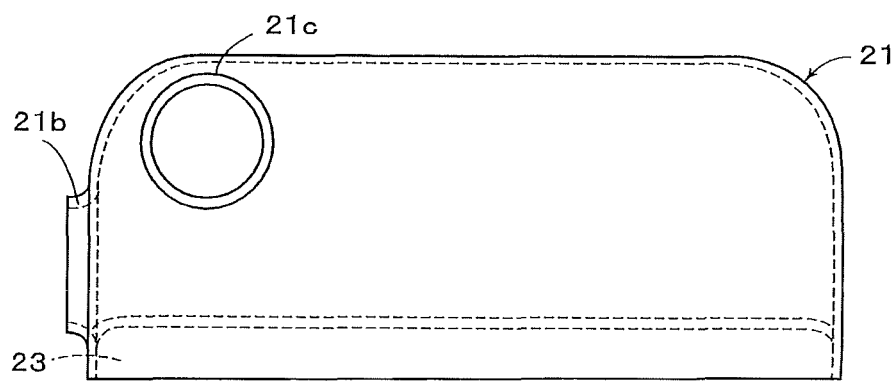
FIG. 13 is a side view of an upper housing for use in an embodiment of the present invention.
Figure 14:
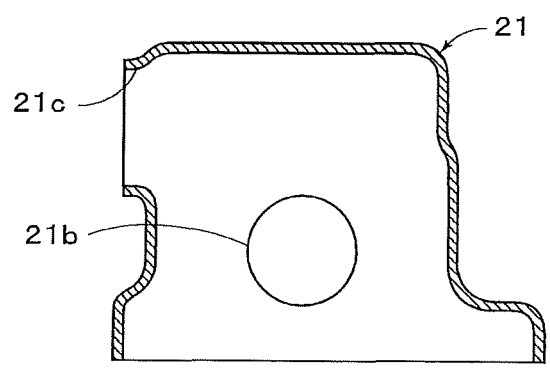
FIG. 14 is a lateral sectional view of an upper housing for use in an embodiment of the present invention.

The upper housing 21 configuring the housing of the heat exchanger 1 is formed in a case shape as shown in FIGS. 13 and 14, and formed with the coolant inlet port 21b and coolant outlet port 21c. In contemplating efficient heat exchange, the coolant inlet port 21b is placed lower than the coolant outlet port 21c (in such a state that it is installed in a vehicle). In a similar purpose, it is so configured that the flow guide plate 24 is positioned between them as shown in FIGS. 2 and 12, and disposed in the upper housing 21 as shown in FIGS. 2 and 3.

On the other hand, the valve device 4 used for the exhaust heat recovery apparatus of the present embodiment, is provided with a first valve member 41 for opening or closing the main exhaust passage 2, a second valve member 42 for opening or closing the bypass passage 3, a single shaft member 43 for supporting the first and second valve members 41, 42 and a holding member 44 for holding the shaft member 43 to be enclosed in the holding member 44, to be supported on at least one side surface (left side surface in FIG. 3 in the present embodiment) of the lower housing 22, and it is so configured that the shaft member 43 is rotated by an actuator 50. Although the holding member 44 is supported by only one side surface (left side surface in FIG. 3) seemingly to provide a cantilevered structure, it is supported by the partition wall member 26 at its opposite ends, substantially to provide a structure supported at both ends.

The second valve member 42 of the present embodiment is configured by a curved plate fixed to a support portion of the disc-shaped first valve member 41, and configured to be pivotally moved in an integrated manner with the first valve member 41 about the shaft member 43, which is supported to be rotatable against the holding member 44 (with its opposite ends being supported by the partition wall member 26). And, the second valve member 42 is disposed so as to open or close the bypass valve 3 at the merged section 2*b*. When the first valve member 41 opens the main exhaust passage 2, therefore, the second valve member 42 closes the bypass valve 3 (not necessarily close it completely), and shields the holding member 44 from the exhaust gas in the main exhaust passage 2. Consequently, the holding member 44 and therefore the shaft member 43 may be protected from being exposed to high temperature exhaust gas in the main exhaust passage 2. Also, as described before, since the partition wall members 25 and 26 are joined to be disposed as an integrated member, not only when they are operated but also when they are assembled, the positional relationship of the first and second valve members 41, 42 relative to the valve seat 25*a* and through hole 26*a* can be maintained surely.

Figure 15:
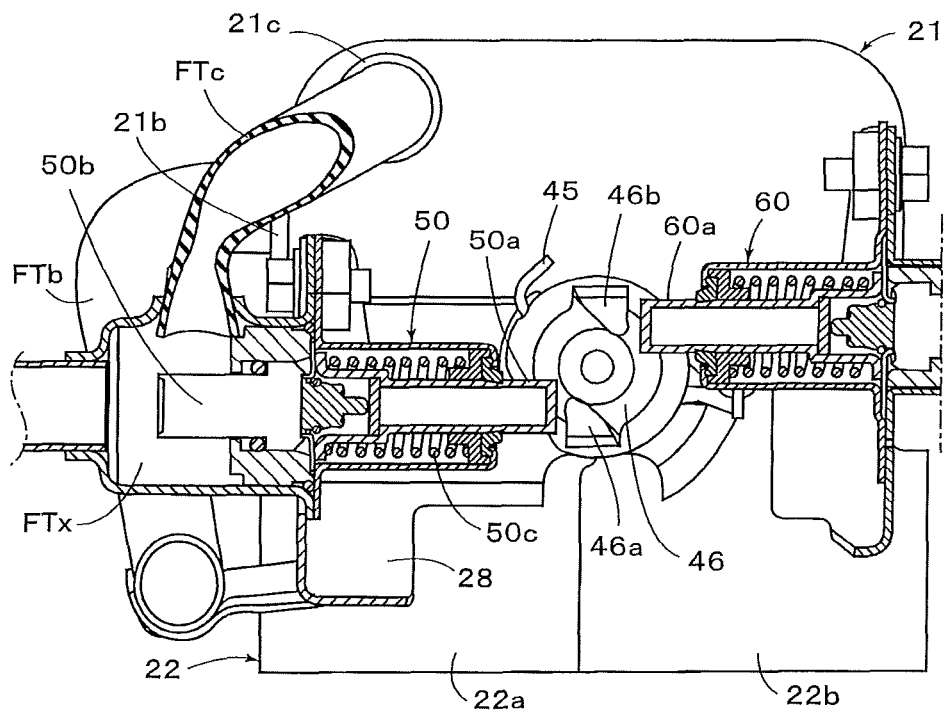
FIG. 15 is a partially sectioned view of an exhaust heat recovery apparatus according to an embodiment of the present invention.
Figure 16:
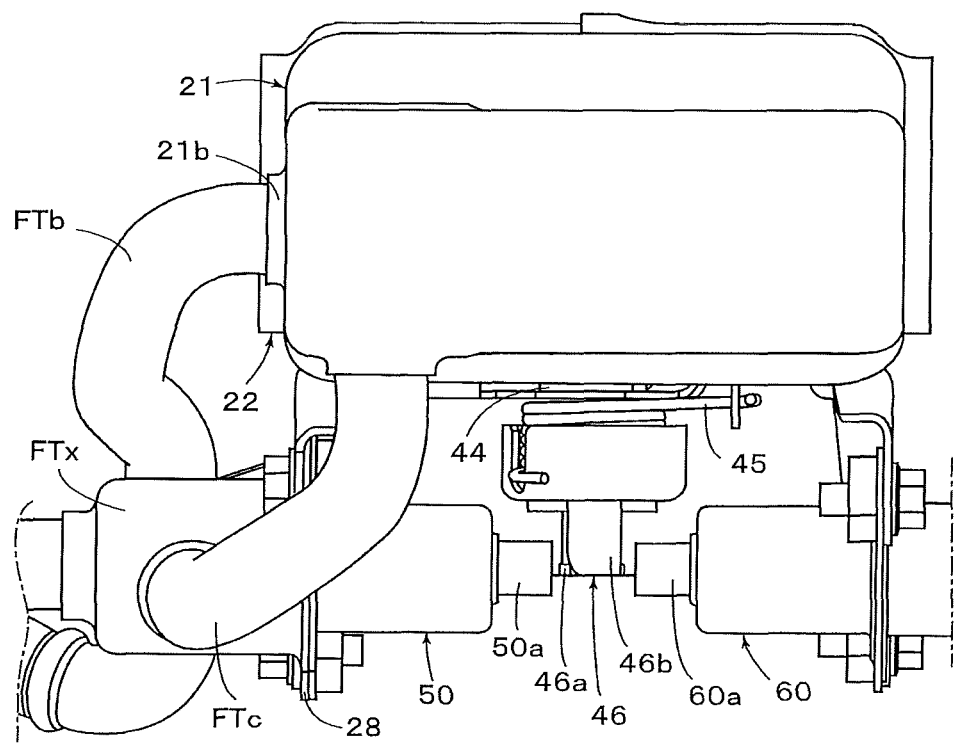
FIG. 16 is a plan view of an exhaust heat recovery apparatus according to an embodiment of the present invention.
Figure 17:
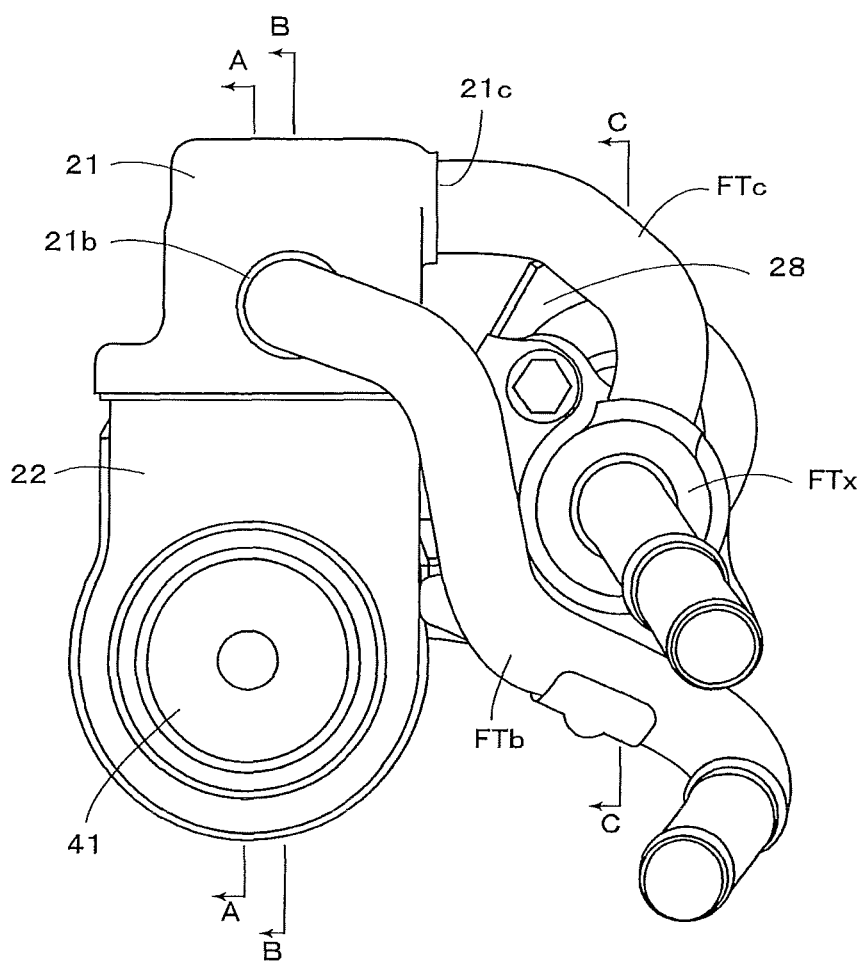
FIG. 17 is a front view of an exhaust heat recovery apparatus according to an embodiment of the present invention.

As shown in FIGS. 15-17, a bracket 28 is secured to the lower housing 22. The actuator 50 is supported by the bracket 28, and the holding member 44 of the valve device 4 is fitted into the bracket 28. The holding member 44 is fitted into the through holes 26*b* of the partition wall member 26 as shown in FIGS. 3 and 8. And, the shaft member 43 accommodated in the holding member 44 to be rotatable extends outside from the lower housing 22, and it is biased toward a predetermined position (closed position of the first valve member 41) by a return spring 45, an end of which is fixed to the bracket 28. Furthermore, a lever 46 is fixed to a tip end of the shaft member 43, and the rod 50*a* of the actuator 50 is disposed to be in contact with its end portion 46*a*.

Then, as shown in FIGS. 15-17, the coolant of the internal combustion engine (not shown) is introduced from the coolant inlet port 21*b* into the upper housing 21 through an inlet pipe (Ftb), and high temperature coolant discharged from the coolant outlet port 21*c* after heat exchanging is recirculated into the internal combustion engine (not shown) through an outlet pipe (Ftc) and temperature sensing portion (Ftx). In FIG. 17, a sectional view sectioned along A-A line corresponds to FIG. 1, sectional view sectioned along B-B line corresponds to FIG. 2, and sectional view sectioned along C-C line corresponds to FIG. 15, respectively. Therefore, the coolant inlet port 21*b* appears in different shapes (vertical dimensions) between the one in FIG. 1 and the one in FIG. 2 (and FIG. 13).

In the present embodiment, as for the actuator 50, as shown in FIG. 15, a temperature sensitive member (thermoelement) 50*b* having the same temperature sensitive wax as used before is employed, and it is so configured that the temperature sensitive member 50*b* is actuated to move forward against the biasing force of the return spring 50*c* in response to the temperature of the coolant after heat exchanging in the temperature sensing portion (Ftx), while an actuator actuated by vacuum pressure, electric motor or the like may be employed. Furthermore, an electric heating actuator 60 is installed in FIGS. 15 and 16, to actuate the first valve member 41 forcibly when it is frozen, the rod 60*a* is disposed to be in contact with an opposite end portion 46*b* to the end portion 46*a* of the lever 46, while it may be omitted.

According to the exhaust heat recovery apparatus as configured above, the embodiment as shown in FIGS. 1-3 illustrates such a state that the coolant is heated rapidly to be used for a warm-up and heating, so as to give priority to the recovery of exhaust heat in a warm-up process for the (cold) internal combustion engine (not shown), wherein the main exhaust passage 2 is fully closed by the first valve member 41, and the bypass passage 3 is fully opened. Consequently, as the exhaust gas flow is indicated by dashed line arrows, all of the exhaust gas introduced from the exhaust pipe (not shown) is fed into the heat exchanger 1 from the gas inlet port 11*a* (gas inlet port 3*a* of the bypass passage 3), to be forced to recover the heat (to be cooled), and exhausted from the gas outlet port 11*b* (gas outlet port 3*b* of the bypass passage 3) to the main exhaust passage 2. In the warm-up process (cold engine), it is desirable that the main exhaust passage 2 is to be fully closed by the first valve member 41, while it is not necessarily fully closed, but it may be slightly opened, as far as the exhaust gas flow in the main exhaust passage 2 is throttled by a necessary amount.

On the other hand, in the case where it is required to have the exhaust efficiency at the time of middle rotation to high rotation of the internal combustion engine (not shown), the main exhaust passage 2 is fully opened, as indicated by two-dotted chain line in FIG. 1, and the bypass pass passage 3 is approximately fully closed by the second valve member 42, almost all of the exhaust gas is exhausted from the main exhaust passage 2 to the exhaust pipe (not shown).

Figure 18:
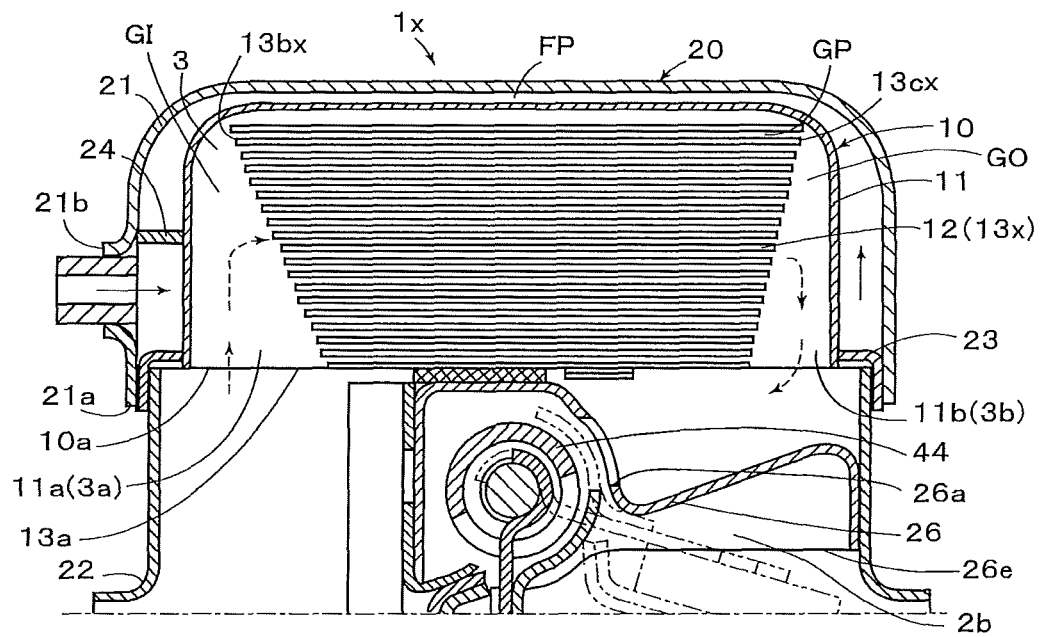
FIG. 18 is a sectional view showing a part of an exhaust heat recovery apparatus according to another embodiment of the present invention.
Figure 19:
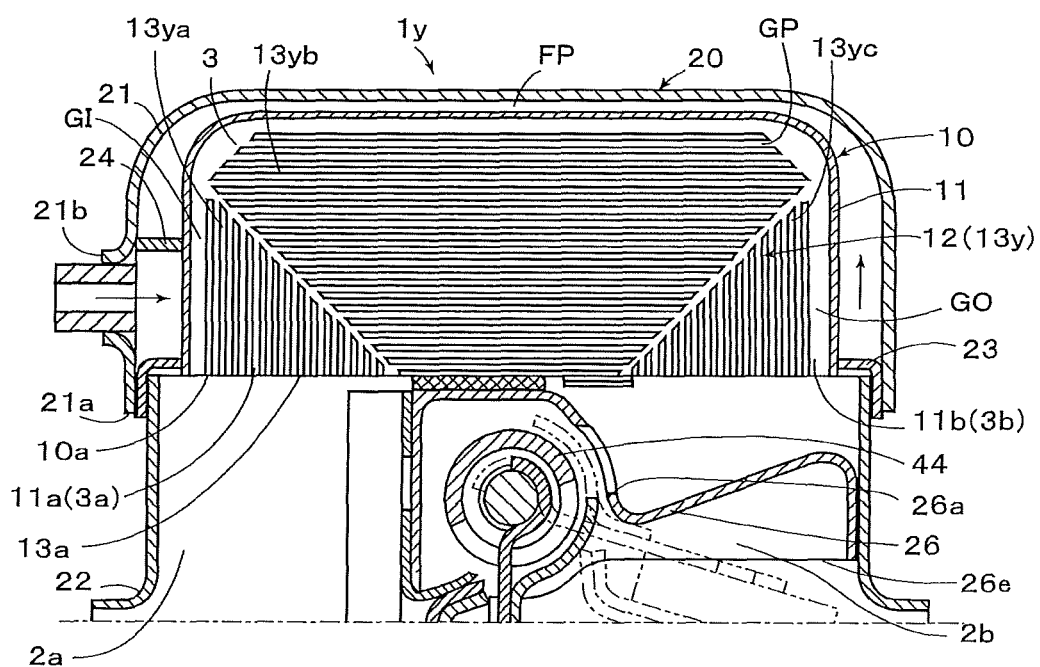
FIG. 19 is a sectional view showing a part of an exhaust heat recovery apparatus according to a further embodiment of the present invention.

Next, FIGS. 18 and 19 show heat exchangers 1*x*, 1*y* according to other embodiments of the present invention, wherein as for the guide member 12 of each heat exchange segment 10, fins 13*x*, 13 *y* are employed, instead of the fin 13 as shown in FIGS. 1 and 2. That is, in FIG. 18, flow area of the gas intake passages (GI) and gas exhaust passages (GO) formed between the opposite end surfaces 13*bx* and 13*cx* of the fin 13*x* and the inner surface of the case 11 are gradually reduced from the gas inlet port 11*a* (gas inlet port 3*a* of the bypass passage 3) and the gas outlet port 11*b* (gas outlet port 3*b* of the bypass passage 3) toward the side remote from them (upward in FIG. 18).

Also, according to the embodiment as shown in FIG. 19, employed is a fin 13*y* comprising there members of fins 13*ya*, 13*yb* and 13*yc*, which are disposed in the exhaust gas passages (GI, GP, GO), respectively. Other structures in FIGS. 18 and 19 are the same as those shown in FIG. 1, so that their explanations are omitted by applying the same numerals to substantially the same members as the members in FIG. 1.

As described above, in any embodiments, a plurality of heat exchange segments 10 are accommodated in the upper housing 21, and the exhaust gas passages (GI, GP, GO) are formed in each heat exchange segment 10, respectively, by which the bypass passage 3 is configured. Therefore, the efficient heat exchange can be made by the heat exchangers 1, 1*x* and 1*y*, with a heat capacity of the bypass passage 3 and the space required for it being made as small as possible, so that miniaturization of the exhaust heat recovery apparatus as a whole can be achieved.

Not only a plurality of heat exchange segments 10 are arranged in such a state as those being installed in the vehicle as shown in FIGS. 1 and 3, but also a plurality of heat exchange segments 10 may be stacked one another in the upward direction of a paper surface of FIGS. 1 and 3 to be installed in the vehicle. The exhaust heat recovery apparatus of the present invention has the heat exchanger 1, main exhaust passage 2 and bypass passage 3 as its basic structure, so that it is not limited to the one of its use or name. That is, it is not limited to the exhaust heat recovery apparatus installed in the internal combustion engine, in a narrow sense, but the present invention may be applied to such an apparatus that is aimed to cool the exhaust gas, with the exhaust heat being recovered as a result, such as a so-called EGR cooler installed in the internal combustion engine, thereby to obtain the desired effects.

DESCRIPTION OF CHARACTERS 1, 1x, 1y heat exchanger
2 main exhaust passage
2a branch section
2b merged section
3 bypass passage
3a, 11a gas inlet port
3b, 11b gas outlet port
4 valve device
10 heat exchange segment
11 case
12 guide member
13, 13x, 13y fin
21 upper housing
22 lower housing
23 plug member
24 flow guide plate
25, 26 partition wall member
27 wire mesh
28 bracket
41 first valve member
42 second valve member
43 shaft member
44 holding member
45 return spring
46 lever
50, 60 actuator

The invention claimed is:

1. A heat exchanger for heat exchanging in a housing between exhaust gas and cooling medium, comprising:
a housing in which the heat exchanging occurs, the housing possessing an inner surface;
a plurality of heat exchange segments juxtaposed in the housing and spaced apart from one another and from the inner surface of the housing; and
a plug member connected fluid-tightly to the housing, the plug member supporting the plurality of heat exchange segments to provide cooling medium passages in each of the gaps between the heat exchange segments adjacent to each other, and between the heat exchange segments and the inner surface of the housing;
each heat exchange segment comprising;
a case having an opening only on a surface of the case, at least an outside of the opening being plugged fluid-tightly by the plug member,
a guide member accommodated in the case, the guide member having a plurality of passages allowing gas flow in only a predetermined direction, and gas intake passages and gas exhaust passages at upstream and downstream of the plurality of passages of the guide member, and
the opening of the case of each segment being provided with a gas inlet port communicated with the gas intake passages, and a gas outlet port communicated with the gas exhaust passages.

2. The heat exchanger of claim 1, wherein the guide member of each heat exchange segment comprises a fin formed by a heat exchange plate in a wave shape having a continuous S-like cross section, wherein a side surface of the fin in an extending direction closes the opening of the case between the gas inlet port and the gas outlet port, and wherein opposite end faces of the fin communicate with the gas inlet port and the gas outlet port, respectively.

3. The heat exchanger of claim 1, further comprising;
a cooling medium inlet port and a cooling medium outlet port formed in the housing to be communicated with the cooling medium passages; and
a flow guide plate disposed between the cooling medium inlet port and the cooling medium outlet port.

4. The heat exchanger of claim 3, wherein the flow guide plate possesses a comb-shaped form that includes teeth, and wherein a part of the teeth configuring the comb-shaped form is disposed in each gap between the plurality of heat exchange segments adjacent to each other.

5. The heat exchanger of claim 4, wherein the flow guide plate has a bent portion with a tip end of a part of the teeth configuring the comb-shaped form being bent, the bent portion providing a cooling medium guide passage to said each gap.

6. The heat exchanger of claim 1, wherein adjacent side surfaces of the cases of the plurality of heat exchange segments each have at least a protruded portion so that the protruded portions are located at a common position on the side surfaces of the cases, and wherein the protruded portion of each case is disposed within a respective one of the cooling medium passages.

7. The heat exchanger of claim 1, wherein the plug member has a plurality of slits formed in parallel with each other, and wherein the openings of the cases are fitted into the slits at the outside of the openings respectively, to support the plurality of heat exchange segments.

8. An exhaust heat recovery apparatus comprising:
a main exhaust passage into which is introduced exhaust gas from an internal combustion engine;
a bypass passage branched off from a part of the main exhaust passage to provide a gas inlet port, and merged into another part of the main exhaust passage to provide a gas outlet port;
a heat exchanger for heat exchanging with the exhaust gas passing through the bypass passage to recover exhaust heat, wherein the heat exchanger comprises:
a plurality of heat exchange segments juxtaposed in a housing that possesses an inner surface, the plurality of heat exchange segments being spaced apart from one another and from the inner surface of the housing; and
a plug member connected fluid-tightly to the housing, the plug member supporting the plurality of heat exchange segments to provide cooling medium passages in each gap between the heat exchange segments adjacent to each other, and between the heat exchange segments and the inner surface of the housing;
each heat exchange segment configuring the plurality of heat exchange segments, comprising;
a case having an opening on only one surface of the case, at least outside of the opening being plugged fluid-tightly by the plug member,
a guide member accommodated in the case, the guide member having a plurality of passages allowing gas flow in only a predetermined direction, and gas intake passages and gas exhaust passages at upstream and downstream of the plurality of passages of the guide member, and
the opening of the case of each segment being provided with a gas inlet port communicated with the gas intake passages to configure the gas inlet port of the bypass passage, and a gas outlet port communicated with the gas exhaust passages to configure the gas outlet port of the bypass passage.

9. The exhaust heat recovery apparatus of claim 8, wherein the guide member of each heat exchange segment comprises a fin formed by a heat exchange plate in a wave shape having a continuous S-like cross section, wherein a side surface of the fin in an extending direction closes the opening of the case between the gas inlet port and the gas outlet port, and wherein opposite end faces of the fin communicate with the gas inlet port and the gas outlet port, respectively.

10. The exhaust heat recovery apparatus of claim 8, wherein the heat exchanger further comprises:
   a cooling medium inlet port and a cooling medium outlet port formed in the housing to be communicated with the cooling medium passages; and
   a flow guide plate disposed between the cooling medium inlet port and the cooling medium outlet port, wherein the flow guide plate possesses a comb-shaped form that includes teeth, and wherein a part of the teeth configuring the comb-shaped form is disposed in each gap between the plurality of heat exchange segments adjacent to each other.

11. The exhaust heat recovery apparatus of claim 10, wherein the flow guide plate has a bent portion with a tip end of a part of the teeth configuring the comb-shaped form being bent, the bent portion providing a cooling medium guide passage to said each gap.

12. The exhaust heat recovery apparatus of claim 8, wherein adjacent side surfaces of the cases of the plurality of heat exchange segments each have at least a protruded portion so that the protruded portions are located at a common position on the side surfaces of the cases, and wherein the protruded portion of each case is disposed within a respective cooling medium passage.

13. The exhaust heat recovery apparatus of claim 8, wherein the housing of the heat exchanger configures an upper housing placed above the main exhaust passage with the opening being positioned below, and wherein a lower housing is connected to the upper housing to form an enclosure shape, the main exhaust passage being provided within the lower housing.

14. The exhaust heat recovery apparatus of claim 13, further comprising:
   a valve device opening or closing communication between the main exhaust passage and the bypass passage, the valve device being provided with at least a valve member accommodated in the lower housing;
   a branch section branching off from the main exhaust passage into the bypass passage; and
   a merged section merged into the main exhaust passage from the bypass passage through the valve member.

15. The exhaust heat recovery apparatus of claim 14, wherein the valve device comprises:
   a first valve member opening or closing the main exhaust passage;
   a second valve member opening or closing the bypass passage;
   a single shaft member supporting the first valve member and second valve member; and
   a holding member holding the shaft member to be enclosed in the holding member, the holding member being supported on at least one side surface of the lower housing.

16. The exhaust heat recovery apparatus of claim 15, wherein the second valve member is disposed to open or close the bypass passage at the merged section, and wherein the second valve member is disposed to close the bypass passage and shield the holding member against the main exhaust passage, when the first valve member opens the main exhaust passage.

17. The exhaust heat recovery apparatus of claim 15, further comprising a bracket secured to at least one of the upper housing and the lower housing, wherein the valve device is provided with an actuator for driving the shaft member to be rotated, and wherein the actuator is supported on the bracket, and the holding member is fitted into the bracket.

* * * * *